United States Patent
Hama et al.

(10) Patent No.: US 11,027,480 B2
(45) Date of Patent: Jun. 8, 2021

(54) METHOD FOR MANUFACTURING HIGH-PRESSURE TANK

(71) Applicant: TOYOTA JIDOSHA KABUSHIKI KAISHA, Toyota (JP)

(72) Inventors: Yuichiro Hama, Nagoya (JP); Takashi Usui, Toyota (JP); Tomoyoshi Kobayashi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/745,713

(22) Filed: Jan. 17, 2020

(65) Prior Publication Data
US 2020/0230864 A1 Jul. 23, 2020

(30) Foreign Application Priority Data
Jan. 21, 2019 (JP) .............................. JP2019-007505

(51) Int. Cl.
*B29C 53/56* (2006.01)
*B29C 53/84* (2006.01)
(Continued)

(52) U.S. Cl.
CPC ............ *B29C 53/56* (2013.01); *B29C 53/845* (2013.01); *B29K 2101/10* (2013.01);
(Continued)

(58) Field of Classification Search
CPC ... B29C 53/56; B29C 53/845; B29K 2307/04; B29K 2105/08; B29K 2101/10; B29L 2031/7172
See application file for complete search history.

(56) References Cited

U.S. PATENT DOCUMENTS 9,186,855 B2 * 11/2015 Hatta .................... B29D 22/00
9,211,683 B2 * 12/2015 Emori .................. B29D 22/003
(Continued)

FOREIGN PATENT DOCUMENTS

JP          6-335973 A    * 12/1994
JP       2013-45532 A    *  3/2013
(Continued)

*Primary Examiner* — Jeffry H Aftergut
(74) *Attorney, Agent, or Firm* — Finnegan, Henderson, Farabow, Garrett & Dunner, LLP

(57) ABSTRACT

A method for manufacturing a high pressure tank capable of uniformly heating a thermosetting resin in a short time is provided. A method for manufacturing a high-pressure tank including: a step (a) of preparing a tank intermediate product including a fiber-reinforced resin layer formed by winding a carbon fiber impregnated with a thermosetting resin around a liner including a cap attached thereto; and a step (b) of performing a process for thermosetting the fiber-reinforced resin layer of the tank intermediate product by induction-heating the fiber-reinforced resin layer using induction-heating means, in which: the induction-heating means includes first induction-heating means for induction-heating a trunk part of the tank intermediate product and second induction-heating means for induction-heating a dome part of the tank intermediate product; and a temperature of the trunk part of the tank intermediate product and a temperature of the dome part thereof are controlled independently.

4 Claims, 9 Drawing Sheets

(51) Int. Cl.
    *B29K 307/04*     (2006.01)
    *B29K 105/08*     (2006.01)
    *B29L 31/00*      (2006.01)
    *B29K 101/10*     (2006.01)

(52) U.S. Cl.
    CPC ...... *B29K 2105/08* (2013.01); *B29K 2307/04* (2013.01); *B29L 2031/7172* (2013.01)

(56) References Cited

U.S. PATENT DOCUMENTS

| | | |
|---|---|---|
| 2014/0096895 A1 | 4/2014 | Emori |
| 2016/0144560 A1 | 5/2016 | Emori |

FOREIGN PATENT DOCUMENTS

| | | | |
|---|---|---|---|
| JP | 2013-163305 A | * | 8/2013 |
| JP | 2015-020280 | | 2/2015 |
| WO | WO 2012/160640 | | 11/2012 |

\* cited by examiner

METHOD FOR MANUFACTURING HIGH-PRESSURE TANK

CROSS REFERENCE TO RELATED APPLICATIONS

This application is based upon and claims the benefit of priority from Japanese patent application No. 2019-7505, filed on Jan. 21, 2019, the disclosure of which is incorporated herein in its entirety by reference.

BACKGROUND

The present disclosure relates to method for manufacturing a high-pressure tank.

As a structure of a vessel of a high-pressure tank, one that includes a carbon fiber layer of fiber reinforced-plastic (FRP) on an outer surface of a liner that serves as the vessel is known. As a method for manufacturing this kind of high-pressure tank, a method for forming the FRP layer by winding carbon fibers impregnated with a thermosetting resin around an outer circumference of the liner by a filament winding method (an FW method) and then thermally curing the thermosetting resin contained in the carbon fibers is known.

In general, the process of thermally curing a thermosetting resin is performed using a heating furnace. For example, Japanese Unexamined Patent Application Publication No. 2015-20280 discloses a method for manufacturing a tank including heating a coated liner around which fibers impregnated with a thermosetting resin are wound by using a heating furnace, in which a temperature of the thermosetting resin is controlled so as not to exceed a heat resistant temperature of the liner by controlling an atmospheric temperature inside the heating furnace.

Meanwhile, from the viewpoint of shortening the heating time etc., a method for performing induction-heating of carbon fibers (hereinafter also described as induction-heating carbon fibers) so as to thermally cure thermosetting resin is being studied. For example, International Patent Publication No. WO2012/160640 discloses a method in which an induction-heating coil is disposed in a circumferential direction of a coated liner and induction-heating of the coated liner is performed by using the coil. Further, International Patent Publication No. WO2012/160640 discloses that a cap, which is difficult to heat by induction-heating, is heated by using a heating shaft.

SUMMARY

Note that for winding carbon fibers around a liner by the FW method, hoop winding and helical winding are known as techniques for winding fibers, and in general, these two techniques are used in combination. Hoop winding is a technique for winding carbon fibers substantially vertically with respect to a central axis of a liner (see, FIG. 8). Further, helical winding is a technique for winding carbon fibers in a spiral at an angle of, for example, 20 to 80 degrees with respect to the central axis of a liner (see, FIG. 9).

Hoop-wound carbon fibers and helically-wound carbon fibers are laminated on a trunk part of the liner. Meanwhile, helically-wound carbon fibers are laminated on a dome part of the liner.

When an induction-heating coil is disposed in a circumferential direction of a liner as described in International Patent Publication No. WO2012/160640, the carbon fibers that are hoop-wound in the circumferential direction are easily induction-heated. On the other hand, the helically-wound carbon fibers are perpendicular to the induction-heating coil and hence, an induction current is less likely to flow therethrough as compared to the hoop-wound carbon fibers. Therefore, the helically-wound carbon fibers are less likely to be induction-heated than the hoop-wound carbon filters.

International Patent Publication No. WO2012/160640 merely points out that aluminum, of which the cap is made, is difficult to induction-heat and hence discloses means for heating the cap. However, the technique disclosed in International Patent Publication No. WO2012/160640 has a problem that, for the reasons described above, the thermosetting resin of the trunk part is easily heated while the thermosetting resin of the dome part is less likely to be heated. The thermosetting resin of the dome part is not directly heated by the heating of the cap. Further, as described in International Patent Publication No. WO2012/160640, the cap is heated by the heating shaft, which takes a longer time to perform than induction-heating. Therefore, the technique disclosed in International Patent Publication No. WO2012/160640 still has a problem in that it cannot uniformly heat the thermosetting resin in a short time.

The present disclosure has been made in order to solve the problem mentioned above and provides a method for manufacturing a high pressure tank capable of uniformly heating a thermosetting resin in a short time.

A method for manufacturing a high-pressure tank according to an embodiment includes:

a step (a) of preparing a tank intermediate product including a fiber-reinforced resin layer formed by winding a carbon fiber impregnated with a thermosetting resin around a liner including a cap attached thereto; and a step (b) of performing a process for thermosetting the fiber-reinforced resin layer of the tank intermediate product by induction-heating the fiber-reinforced resin layer using induction-heating means, in which:

the induction-heating means includes first induction-heating means for induction-heating a trunk part of the tank intermediate product and second induction-heating means for induction-heating a dome part of the tank intermediate product; and a temperature of the trunk part of the tank intermediate product and a temperature of the dome part thereof are controlled independently of each other by controlling an output of the first induction-heating means and an output of the second induction-heating means independently of each other in the step (b).

According to the method for manufacturing the high pressure tank described above, since the first induction-heating means for induction-heating the trunk part and the second induction-heating means for induction-heating the dome part can be controlled independently of each other, it becomes easy to reduce the difference in temperature between the trunk part and the dome part and to control the temperatures of the trunk part and the dome part to their target temperatures. Further, since both the trunk part and the dome part are heated by induction-heating, temperatures thereof can be raised to their target temperatures in a short time.

In the method for manufacturing the high pressure tank, the first induction-heating means may be an induction-heating coil disposed so as to surround a tank intermediate product along a longitudinal direction of the tank intermediate product. By employing such an induction-heating coil for the first induction-heating means, helically-wound carbon fibers can be induction-heated. Accordingly, not only the trunk part but also the dome part can be heated by the first induction-heating means. Therefore, the output of the second induction-heating means can be reduced.

Further, in the aforementioned step (b), the temperature of the trunk part and the temperature of the dome part are measured, and based on the measured temperatures, the output of the first induction-heating means and the output of the second induction-heating means may be controlled. By this structure, the output of the induction-heating means can be precisely adjusted in accordance with an individual difference of each tank etc.

Further, in the aforementioned step (b), the output of the first induction-heating means may be gradually decreased over time.

The present disclosure provides a method for manufacturing a high pressure tank capable of uniformly heating a thermosetting resin in a short time.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinbelow, the present disclosure will be explained with reference to embodiments. However, the disclosure according to the claims is not limited to the embodiments. Further, not all of the components/structures explained in the embodiments are essential in solving the problem.

Figure 1:
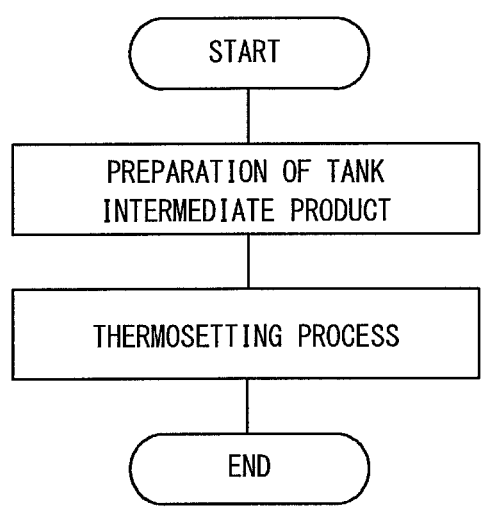
FIG. 1 is a flow chart showing a method for manufacturing a high-pressure tank according to an embodiment.

FIG. 1 is a flow chart showing a method for manufacturing a high-pressure tank according to this embodiment. A method for manufacturing a high-pressure tank according to this embodiment is briefly explained. First, a tank intermediate product including an uncured fiber-reinforced resin layer is prepared by winding carbon fibers impregnated with a thermosetting resin around a liner to which a cap is attached (Step (a)). Then, a process of thermosetting the fiber-reinforced resin layer of the tank intermediate product by induction-heating is performed (Step (b)). Note that in this embodiment, the carbon fibers are heated by induction-heating and owing to the heat generated in the carbon fibers, the contained thermosetting resin is heated and cured.

Figure 2:
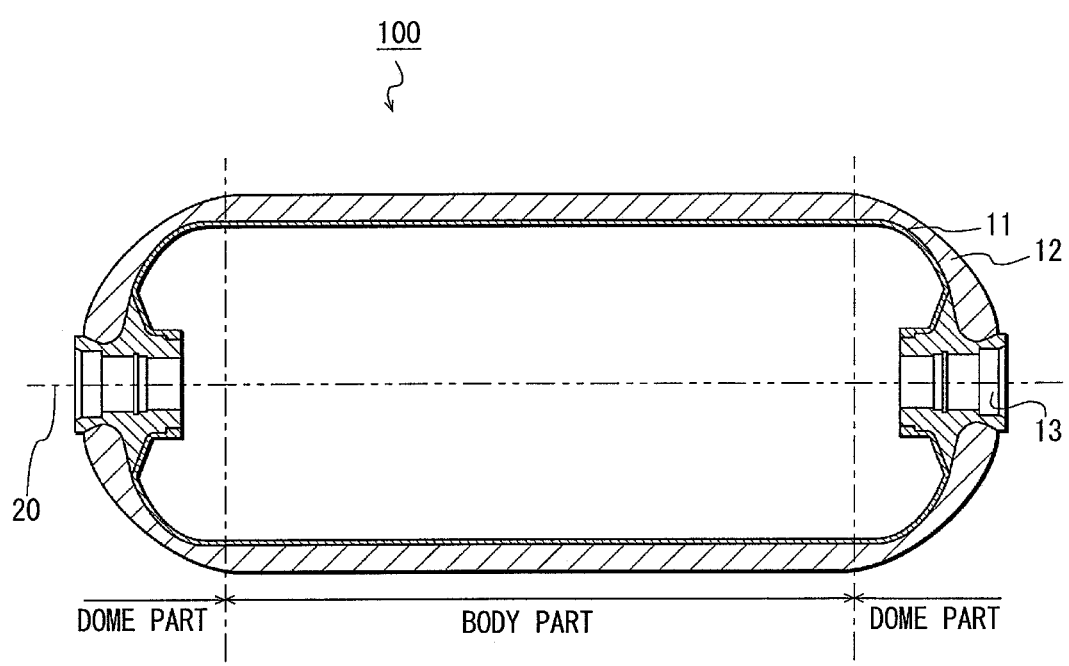
FIG. 2 is a sectional diagram schematically showing an example of a tank intermediate product.

FIG. 2 is a sectional diagram schematically showing an example of a tank intermediate product. The tank intermediate product 100 includes a fiber-reinforced resin layer 12 formed by winding carbon fibers impregnated with a thermosetting resin around an outer circumference of a hollow liner 11 to which a cap 13 is attached. In the tank intermediate product 100, the thermosetting resin in the fiber-reinforced resin layer 12 is prior to being cured. Although the thermosetting resin is not specifically limited, an epoxy resin may be given as an example, and it is usually added with a thermosetting material.

The liner 11 is a hollow container having a gas barrier property against gas (for example, a hydrogen gas) to be accommodated therein. The liner 11 includes a trunk part that has a substantially cylindrical shape with a uniform radius, and a dome part having a convex surface that is disposed at each end of the trunk part. Any material may suffice for the liner as long as it has a gas barrier property, for example, resin such as high-density polyethylene, polyimide, nylon or the like may be used.

Each dome part has a cap 13 attached thereto. The cap 13 can be additionally processed in accordance with its usage. Further, the processing that is necessary in accordance with the usage is not limited to one that is performed additionally and may be performed while preparing the tank intermediate product. The material of the cap is not specifically limited in this embodiment. For example, even aluminum that is difficult to be induction-heated can be suitably used.

Winding of the carbon fibers around the liner 11 can be performed by a known method. For example, the carbon fibers can be wound around the outer circumference of the liner 11 by feeding the carbon fibers impregnated with the thermosetting resin toward the liner 11 mounted in a rotational driving apparatus and making a guide of the carbon fibers perform predetermined reciprocating motions along an axial direction of the liner.

For example, hoop-wound carbon fibers are laminated on the trunk part by winding the carbon fibers around the trunk part of the liner 11 substantially vertically with respect to a central axis 20. Further, by winding the carbon fibers roughly longitudinally across the two dome parts at an angle of 20 to 80 degrees with respect to the central axis of the liner, helically-wound carbon fibers are laminated on the trunk part and the dome parts of the liner. In general, the carbon fibers are wound while switching between and combining the hoop winding and the helical winding and thus, the hoop-wound carbon fibers and the helically-wound carbon fibers are laminated on the trunk part of the liner. Further, the helically-wound carbon fibers are laminated on the dome parts of the liner. As a result, the tank intermediate product 100 can be obtained.

Figure 3:
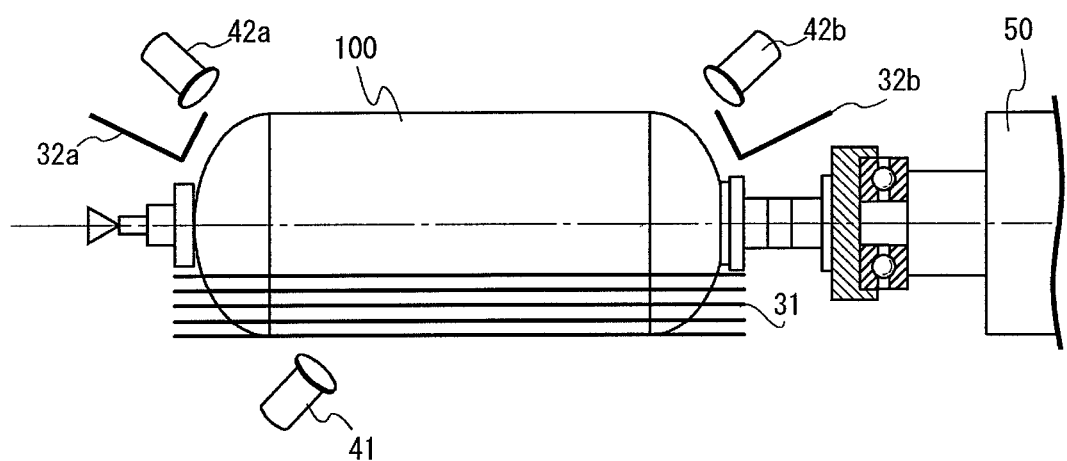
FIG. 3 is a schematic diagram explaining a manufacturing apparatus for carrying out a heating process.
Figure 4:
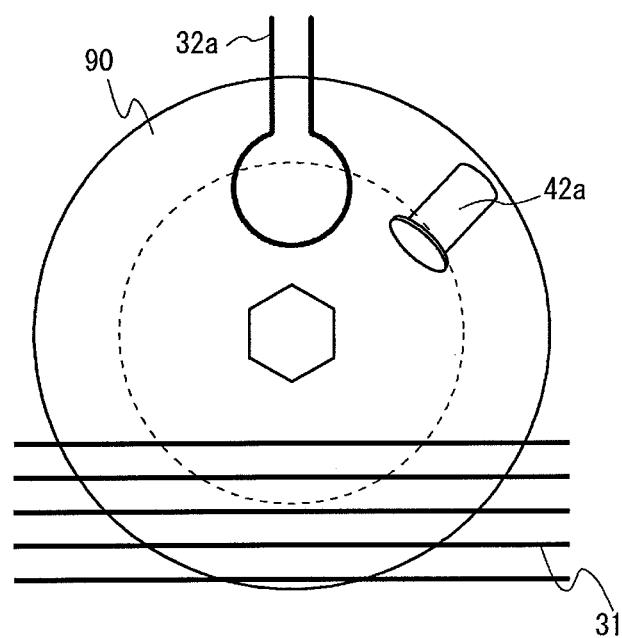
FIG. 4 is a left-side view of FIG. 3.

FIG. 3 is a schematic diagram explaining a manufacturing apparatus for carrying out a heating process. Further, FIG. 4 is a left-side view of FIG. 3.

The tank intermediate product 100 is axially supported by a holder 50. Next, each of the first induction-heating means 31 for induction-heating the trunk part, the second induction-heating means 32a-b for induction-heating the dome parts, a first temperature measurement means 41 for measuring a temperature of the trunk part, and second temperature measurement means 42a-b for measuring temperatures of the dome parts is disposed. The second induction-heating means and the second temperature measurement means are disposed in the two dome parts, respectively. The outputs of the first induction-heating means 31 and the two second induction-heating means 32a-b can be controlled independently of each other.

The first induction-heating means 31 is provided to heat the trunk part, an example of which is an induction-heating coil. The induction-heating coil may be disposed along the longitudinal direction of the tank intermediate product 100 so as to surround the tank intermediate product 100 as shown in the examples of FIGS. 3 and 4. By disposing the induction-heating coil in this manner, the helically-wound carbon fibers can be heated, and it is possible to heat the trunk part by the first induction-heating means 31 while heating the dome parts in a supplemental manner. As a result, the output of the second induction-heating means can be reduced.

The induction-heating coil may surround the whole tank intermediate product 100. However, since the tank intermediate product 100 is heated while being rotated, the induction-heating coil may be disposed, for example, only in an area below the central axis 20 of the tank intermediate product 100.

The second induction-heating means 32*a-b* are provided to heat the carbon fibers of the dome parts, an example of which is induction-heating coils.

The first and second temperature measurement means 41 and 42*a-b* are provided for measuring the temperatures of the trunk part and the dome parts, respectively. A noncontact thermometer can be employed for the temperature measurement means.

Figure 5:
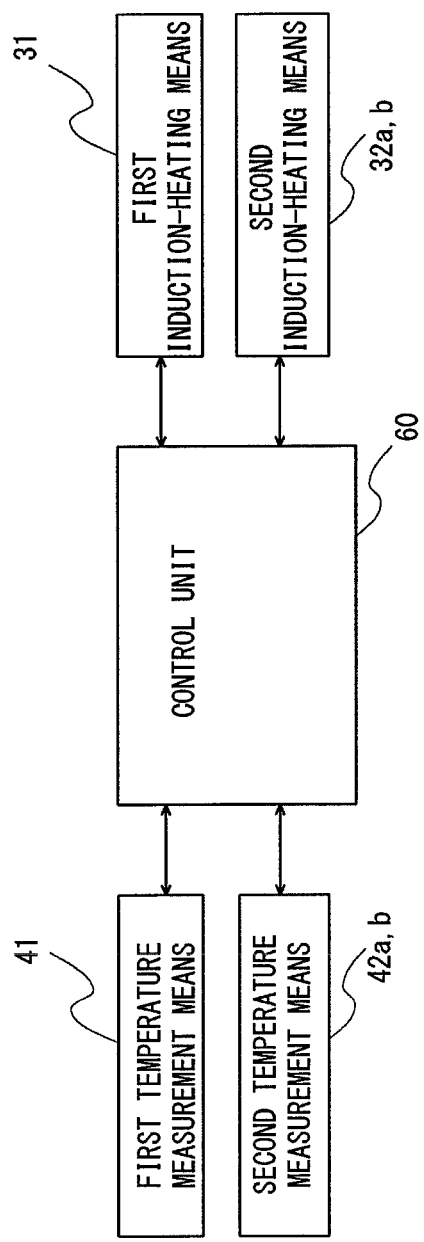
FIG. 5 is a block diagram showing a configuration of a system.

FIG. 5 is a block diagram showing a configuration of a system. The first induction-heating means 31, the second induction-heating means 32*a-b*, the first temperature measurement means 41, and the second temperature measurement means 42*a-b* are connected to a control unit 60, respectively. The control unit 60 controls the outputs of the induction-heating means 31 and 32*a-b* based on the temperatures of the trunk part and the dome parts that are input from the temperature measurement means 41 and 42*a-b*, respectively.

Figure 6:
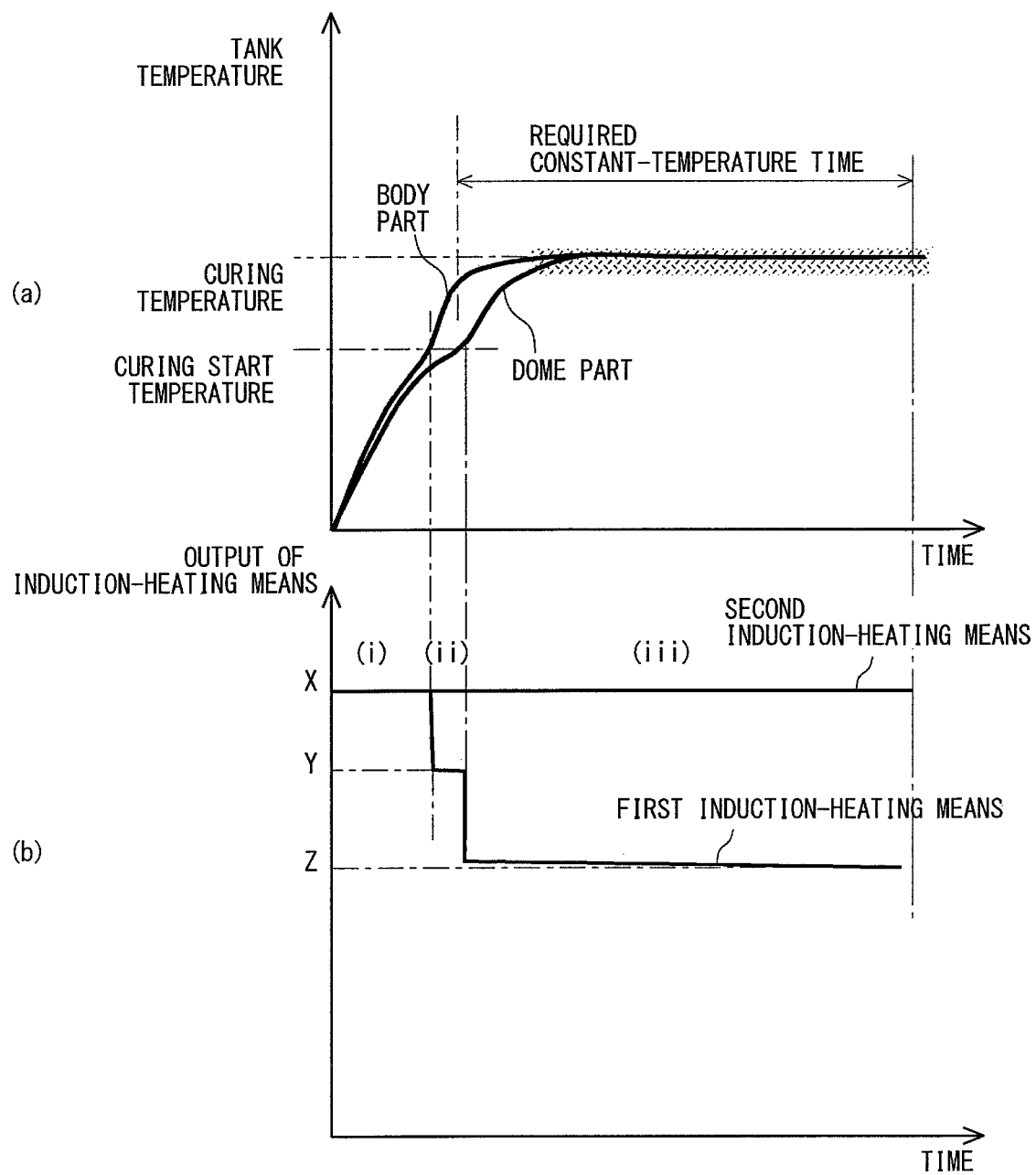
FIG. 6 shows graphs showing an example of temperature control.
Figure 7:
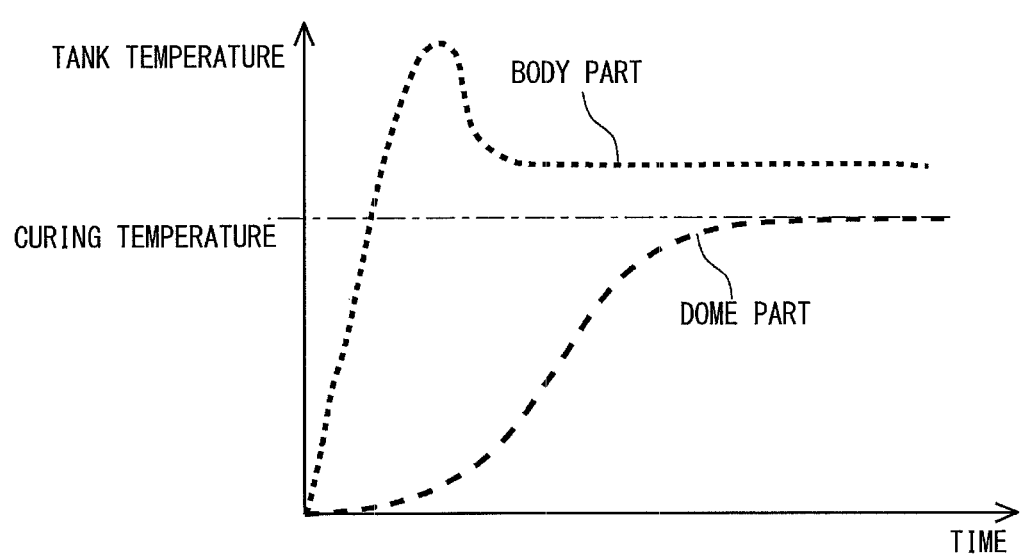
FIG. 7 is a graph showing an example of temperature changes in a tank when temperature control is not performed.
Figure 8:
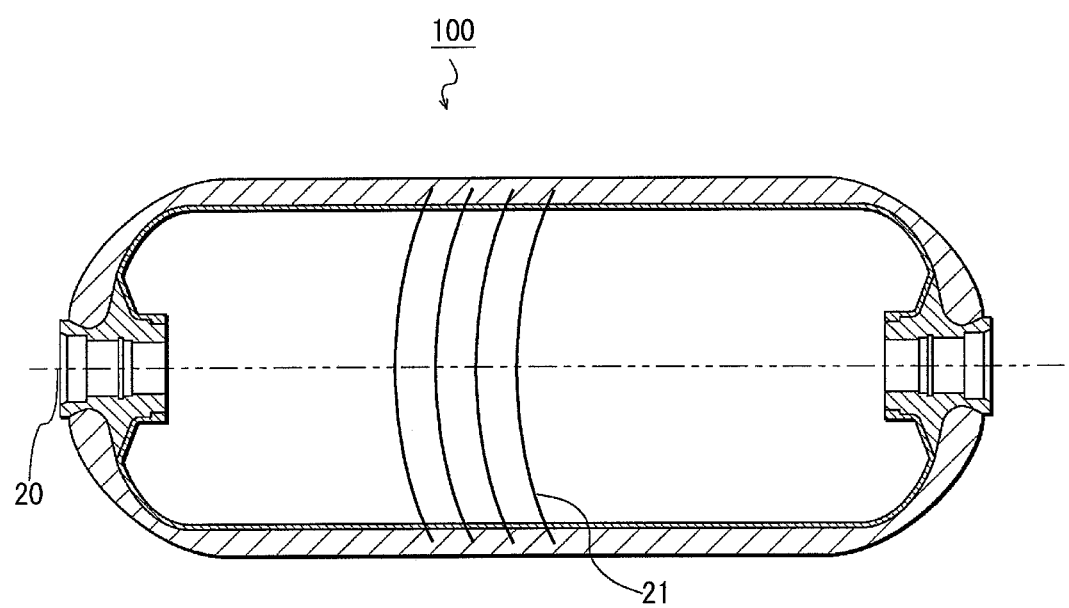
FIG. 8 is a schematic diagram explaining the hoop winding.
Figure 9:
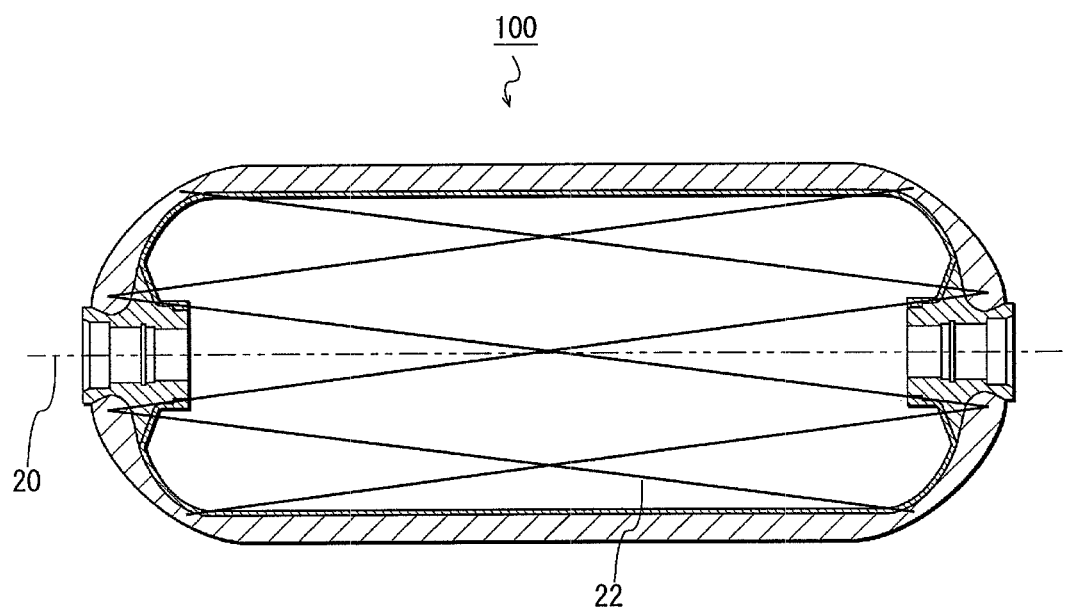
FIG. 9 is a schematic diagram explaining the helical winding.

FIG. 6 shows graphs showing an example of temperature control. FIG. 6(*a*) is a graph showing an example of changes in a tank temperature in the heating process and FIG. 6(*b*) is a graph showing examples of outputs of the induction-heating means. Further, for comparison, FIG. 7 shows a graph showing an example of temperature changes in a tank when temperature control is not performed. Note that in the example shown in FIG. 7, the induction-heating coil is disposed in the circumferential direction of the tank intermediate product and the second induction-heating means for heating the dome parts are not provided.

In the example shown in FIG. 7, when the induction-heating is started, the temperature of the trunk part rises relatively rapidly whereas the temperatures of the dome parts rise slowly. It is believed that this is because the thermal capacity of the caps that are in contact with the respective dome parts is large and an induction current is unlikely to be generated in the helically-wound carbon fibers that constitute the dome parts. In the example shown in FIG. 7, it is necessary to increase the output of the induction-heating means in order to heat the dome parts. In such a case, the temperature of the trunk part temporarily causes deterioration of the liner that constitutes the trunk part. Further, when the output of the induction-heating means is set so that the temperatures of the dome parts are maintained at their target temperatures, excessive heat is generated in the trunk part, raising the temperature of the trunk part beyond the curing temperature thereof, which is the target temperature of the trunk part.

As shown in FIG. 6, in this embodiment, firstly, heating by the first induction-heating means and heating by the second induction-heating means are simultaneously started (i). In this region, since the trunk part and the dome parts of the tank are similarly heated, the temperature of the whole tank can be raised without excessively heating the trunk part. After the tank temperature reaches the curing start temperature of the thermosetting resin, the output of the induction-heating means may be gradually decreased. In the example shown in FIG. 6, after the tank temperature reaches the curing start temperature, the speed at which the temperature rises is adjusted by lowering the output of the first induction-heating means. After the tank temperature reaches the target curing process temperature, the output of the induction-heating means may be adjusted so as to maintain the tank temperature constant. As described above, the whole tank intermediate product can be uniformly heated in a short time.

As a modified example of this embodiment, an output profile of the induction-heating means may be created and heating by the induction-heating means may be controlled based on the profile. According to this technique, there is an advantage that the temperature measurement need not be performed each time for the same tank intermediate product.

On the other hand, considering the variations in the tank intermediate product, the embodiment described above, in which the temperature of the trunk part and the temperatures of the dome parts are measured and based on the measured temperatures, the outputs of the first induction-heating means and the second induction-heating means are controlled, is preferable.

As described above, the thermosetting resin can be uniformly heated in a short time through the thermal-curing process by the method for manufacturing the high-pressure tank according to this embodiment. Further, since no excessive heat is applied to the trunk part of the liner, it is possible to prevent the liner from deteriorating owing to heat.

The high-pressure tank obtained in this embodiment is not specifically limited in its usage, and may be employed, for example, as a main component of a hydrogen tank incorporated into a fuel cell vehicle.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for manufacturing a high-pressure tank comprising:
   a step (a) of preparing a tank intermediate product including a fiber-reinforced resin layer formed by winding a carbon fiber impregnated with a thermosetting resin around a liner including a cap attached thereto; and
   a step (b) of performing a process for induction-heating the fiber-reinforced resin layer of the tank intermediate product by induction-heating the fiber-reinforced resin layer using induction-heating means, wherein:
   the induction-heating means comprises first induction-heating means for induction-heating a trunk part of the tank intermediate product and second induction-heating means for induction-heating a dome part of the tank intermediate product; and
   a temperature of the trunk part of the tank intermediate product and a temperature of the dome part thereof are controlled independently of each other by controlling an output of the first induction-heating means and an output of the second induction-heating means independently of each other in the step (b).

2. The method for manufacturing the high-pressure tank according to claim 1, wherein the first induction-heating means is an induction-heating coil disposed so as to surround the tank intermediate product along a longitudinal direction of the tank intermediate product.

3. The method for manufacturing the high-pressure tank according to claim 1, wherein in the step (b), the temperature of the trunk part and the temperature of the dome part are measured, and based on the measured temperatures, the output of the first induction-heating means and the output of the second induction-heating means are controlled.

4. The method for manufacturing the high-pressure tank according to claim 1, wherein in the step (b), the output of the first induction-heating means is gradually decreased over time.

* * * * *